Feb. 15, 1966 B. D. LOUGHLIN 3,235,656

COLOR-TELEVISION RECEIVER

Filed Feb. 26, 1953 4 Sheets-Sheet 1

Feb. 15, 1966 B. D. LOUGHLIN 3,235,656

COLOR-TELEVISION RECEIVER

Filed Feb. 26, 1953 4 Sheets-Sheet 2

3,235,656
COLOR-TELEVISION RECEIVER
Bernard D. Loughlin, Lynbrook, N.Y., assignor to Hazeltine Research, Inc., Chicago, Ill., a corporation of Illinois
Filed Feb. 26, 1953, Ser. No. 339,145
8 Claims. (Cl. 178—5.4)

Figure 1:
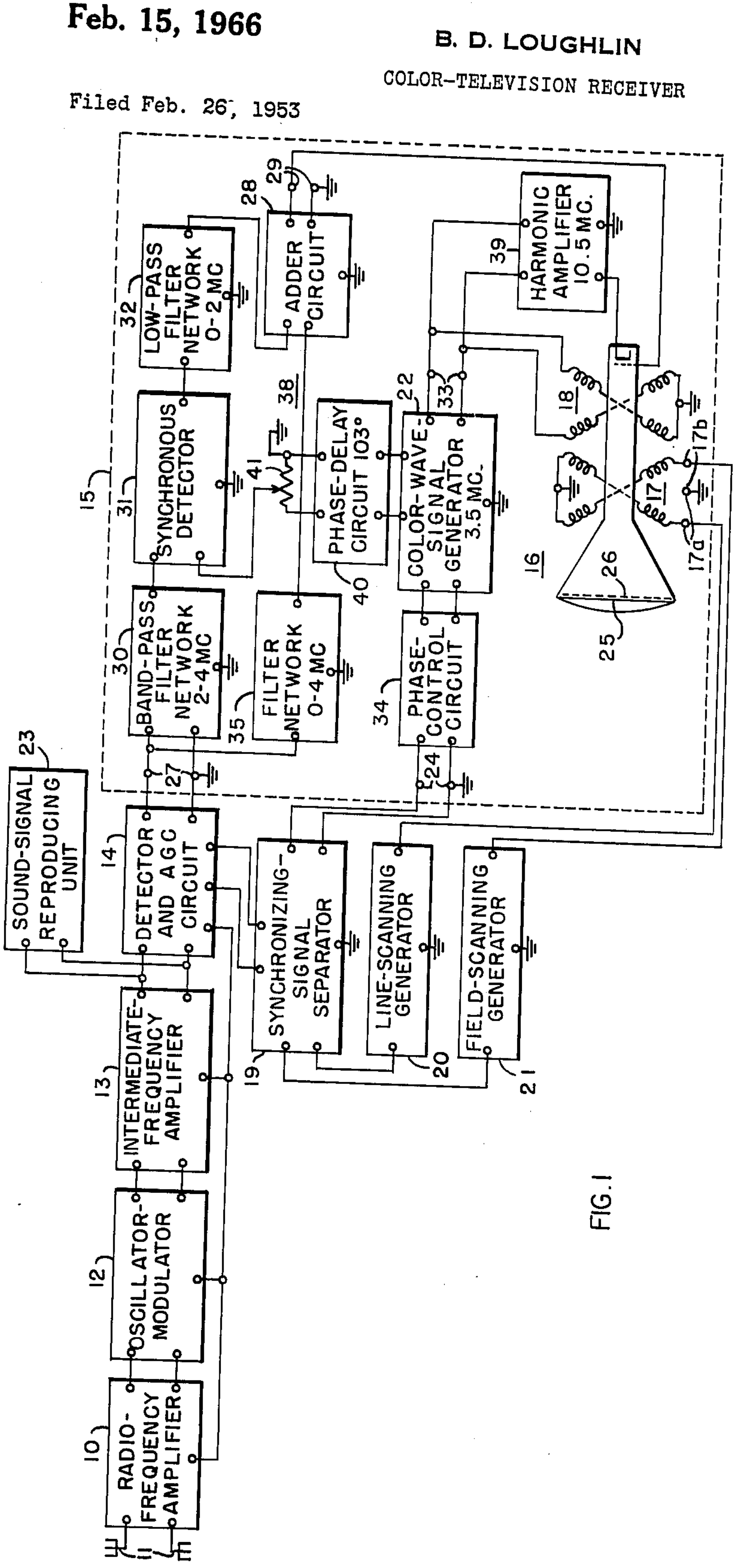

The present invention relates in general to color-television receivers, especially to receivers for use in such systems as are compatible with standardized monochrome systems. In particular, the invention relates to new and improved signal-translating systems for use in such receivers which have the characteristic of reducing the annoyance of random brightness noise fluctuations to the viewer of a reproduced image. The present invention represents improvements in signal-translating systems of the type disclosed and claimed in applicant's copending application Serial No. 159,212, filed May 1, 1950, now U.S. Patent No. 2,773,929, and entitled "Color-Television System."

The signal-translating system of the above-mentioned copending application is adapted to provide, in a color-television system of the type just mentioned, an arrangement by means of which the visual brightness of a reproduced image is determined primarily by the monochrome component of a composite video-frequency signal. As discussed in the copending application, in some forms of compatible color-television systems the brightness of a reproduced image is determined not only by the monochrome component of the image but also by the color-signal components representative of the chromaticity of the image. As a result, any noise or spurious components peculiar to the color-signal components appear in the reproduced image as brightness noise thereby degrading the quality of the image. Since much of such noise or many of the spurious signals is generally developed by a heterodyning of high-frequency monochrome components or high-frequency noise signals with the subcarrier wave signal modulated by the color-signal components, as explained in the copending application, the noise signals appear, in a demodulating system in which the signals representative of color are derived in a predetermined phase sequence, in the different reproduced colors in various phase relationships to one another. Since similar noise components occur in each of the reproduced colors, if each of these colors had the same brightness effect on the human eye, the noise components present would effectively cancel one another in each cycle of the modulated subcarrier wave signal. Since the different colors have different brightness effects on the human eye, the noise components do not cancel. The copending application describes the arranging and proportioning of the parameters of a signal-translating system in such manner as to cause these noise and spurious components optically to cancel in the reproduced image. Such a result is produced by causing the noise and spurious effects in the different color signals to have equal and opposing optical effects on the human eye thereby causing the optical effects to add in an algebraic manner in the human eye to produce the cancellation. A television system of the latter type is known as a constant luminance system since the brightness of the reproduced images is not affected by changes in the coloring in the image, that is, remains constant in the presence of such changes.

The signal-translating system presented in the copending application broadly describes the invention and particularly applies it to a color-television system in which a single-color image-reproducing tube or the equivalent of such is utilized for every color. Essentially, such a signal-translating system requires that the demodulation of the components of the composite color signal occur prior to the application of the color signals to the image-reproducing apparatus. This is desired in order that the proper proportioning of the color signals can be individually effected so that they produce the desired effects in the reproduced image. The signal-translating system described in the copending application may also be utilized with an image-reproducing apparatus in which symmetrical demodulation of the composite color signal occurs within the apparatus, provided certain changes are made to portions of the system. The present invention is directed to a signal-translating system including such changes.

In an article entitled "General Description of Receivers for the Dot-Sequential Color Television System Which Employ Direct-View Tri-Color Kinescopes" in the June 1950 issue of the RCA Review at pages 228–232, inclusive, there is described a color image-reproducing tube having a single electron gun and, therefore, a single electron beam so arranged as to produce a color image from three primary colors. It is proposed that a tube of this type be utilized in a color-television receiver in such manner that a composite video-frequency signal having both monochrome-signal components representative of the brightness of an image and the modulated subcarrier wave signal including modulation components representative of the color characteristics thereof be applied to a control electrode of the tube. The separation from each other of the color-signal components relating to the primary colors is then made to occur as the electron beam in the tube travels from the control electrode thereof to the image screen thereof. To effect the latter result, the image screen of the tube is composed of an orderly array of small, closely spaced dots or elemental areas arranged in substantially triangular groups, each group comprising a dot for developing green, a dot for developing red, and a dot for developing blue. A mask having apertures suitably located with respect to the dots is positioned between the screen and the electron gun. A magnetic field rotating at the frequency of the color wave signal is developed around the neck of the tube at a point between the control electrode and the image screen thereof and causes the electron beam continuously to rotate in a tight helix at the frequency of the color wave signal. By proper phasing of the rotational field with relation to the phase of the composite video-frequency signal applied to the control electrode of the cathode-ray tube, at any instant the electron beam can be caused to pass through the mask at such an angle as to fall at that instant upon a dot for developing any selected one of the three colors. In this manner, at the instant when the beam is directed at one dot on the screen the color signal corresponding to that dot and which is a component of the composite video-frequency signal is applied to the control electrode of the tube effectively as a pulse and, in this way, intensity-modulates the dot to develop the proper color.

If a composite video-frequency signal of the type described in the copending application referred to above and which is adapted to effect the cancellation of certain noise and spurious signals, as previously described, is applied to the control electrode of a single gun tube of the type just considered, the image reproduced therein would not faithfully reproduce the colors of the televised image. This lack of fidelity would result from the fact that such a composite video-frequency signal is purposely developed at the transmitter so as to have the components thereof in a particular relationship with respect to one another in order that the relative proportions of these components may be varied at the receiver to produce the cancellation of the noise and spurious effects in the manner considered above. Since no such correction would ordinarily take place when a single gun color tube of the type discussed is being utilized, the resultant image reproduced therein would, therefore, be lacking in fidelity. Consequently, it is desirable that the composite video-frequency signal or at least the monochrome components thereof, since the eye is more sensitive to the brightness effects of the latter components and less sensitive to color variations in the color-signal components, be modified so that upon application of the aforesaid composite signal to the control-electrode circuit of a single gun color tube of the type just described the resultant reproduced image will not be lacking in fidelity and the benefits of the system described in the application referred to above will be retained.

It is an object of the present invention, therefore, to provide for a color-television receiver a new and improved signal-translating system which avoids the aforementioned limitation of the prior signal-translating system.

It is another object of the present invention to provide for a color-television receiver which utilizes a single gun color image-reproducing tube and symmetrical color-signal demodulation, a signal-translating system which develops a composite video-frequency signal for application to such tube so that the amount of visual brightness noise present in an image reproduced therein is substantially no greater than that present in a similar type of monochrome television system.

It is still another object of the present invention to provide for a color-television receiver which utilizes a single gun color image-reproducing tube and symmetrical color-signal demodulation, a signal-translating system which develops a monochrome-signal component of a television signal which substantially determines the visual brightness of a reproduced image and color-signal components which substantially determine the color characteristics thereof while any visual brightness effects produced thereby are substantially canceled.

It is still a further object of the present invention to provide for such a receiver a new and improved signal-translating system which is effective to develop a correction signal for canceling at least some of the visual brightness noise produced by the color-signal components.

In accordance with the present invention, there is provided a signal-translating system for a color-television receiver comprising a circuit for supplying a first signal primarily representative of the visual brightness of the televised color image and a second signal effectively multiplex-modulated by signals primarily representative of the chromaticity of the image. The system also includes a color image-reproducing apparatus for utilizing the first and second signals to reproduce the color image and in which the second signal when applied thereto tends to affect the visual brightness of the image. The system also includes a signal-translating network coupled to the supply circuit and responsive to the second signal and including a detector arrangement effectively for deriving from the second signal a correction signal representative of that component of the second signal which tends to affect the visual brightness of the reproduced image. Finally, the system includes a control circuit coupled to the signal-translating network, the supply circuit, and the apparatus effectively for applying the first signal, the second signal, and the correction signal to the apparatus and including a signal-combining device effectively for adding the first and the correction signals, whereby in the image-reproducing apparatus the first signal is effective primarily to determine the visual brightness of the reproduced image, the second signal is effective primarily to determine the chromaticity of the image, and the correction signal is effective substantially to cancel any brightness which the second signal tends to produce in the image.

The term "monochrome signal" as used hereinafter represents that portion of the composite video-frequency signal that would be produced as an image in a standard monochrome receiver. Thus, the monochrome signal can be considered substantially to be the average of the composite video-frequency signal over a complete cycle of the color wave signal, in other words, as being the composite video-frequency signal but having removed therefrom any subcarrier signals and their modulation components inserted to translate the color characteristics or chromaticity of an image. The monochrome signal may be a signal including equal amounts of all colors or may be a signal composed of a predominant amount of one of the primary colors weighted with respect to the visual brightness effects of the colors.

The term "color signal" as used hereinafter represents a signal whose instantaneous value is proportional to the intensity of a primary color of an elemental area of the image being scanned at the transmitter. Portions of the frequency band of this signal are designated as "color-signal components."

The term "composite color-signal component" as used hereinafter represents the multiplex-modulated subcarrier wave signal formed by the modulation of a generated color wave signal or subcarrier wave signal by selected frequency components of the color signal or, in other words, by color-signal components. The composite color-signal component has amplitude and phase characteristics related to the chromaticity of the image being televised.

The term "composite video-frequency signal" as used hereinafter represents a signal resulting from the combination of the monochrome signal and the composite color-signal component.

For a better understanding of the present invention, together with other and further objects thereof, reference is had to the following description taken in connection with the accompanying drawings, and its scope will be pointed out in the appended claims.

Figure 3:
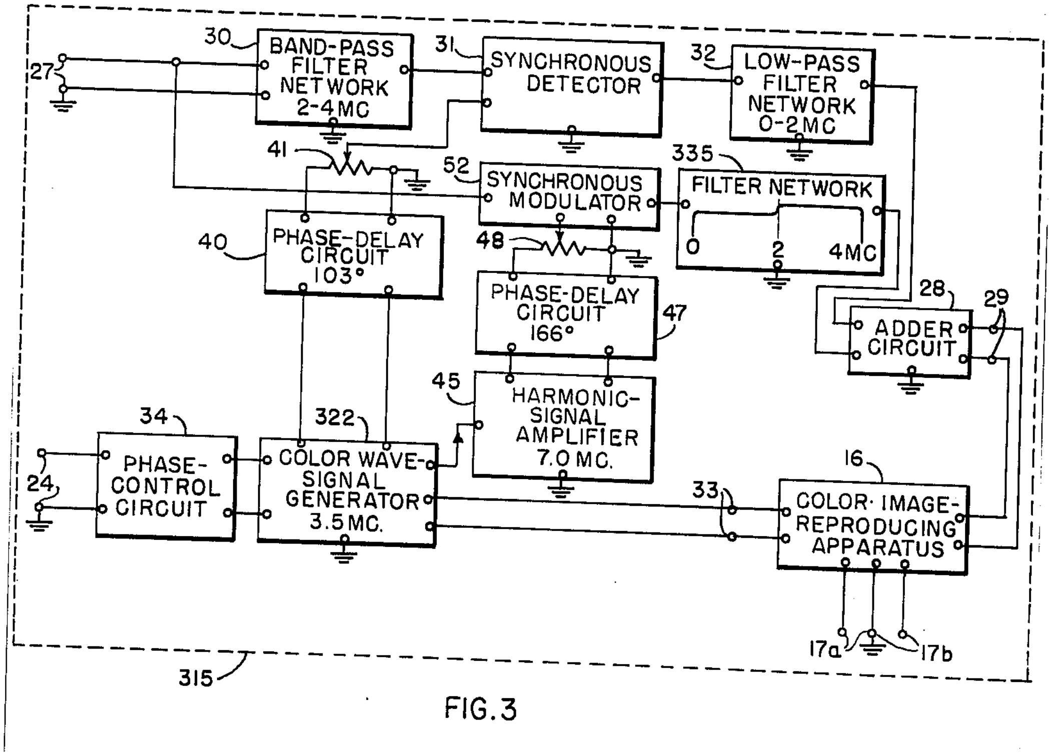

In the drawings:

FIG. 1 is a schematic diagram of a color-television receiver embodying a signal-translating system in accordance with one form of the invention;

FIGS, 2, 3, 4, and 5 are schematic diagrams of portions of modified embodiments of the invention which may be used in the receiver of FIG. 1, and FIGS. 3*a*–3*e*, inclusive, are vector diagrams of signals helpful in explaining the operation of the embodiment of FIG. 3.

*General description of color-television receiver of FIG. 1*

Referring to FIG. 1 of the drawings, there is represented a color-television receiver embodying a signal-translating system in accordance with one form of the invention. This receiver includes a radio-frequency amplifier 10 of any desired number of stages having its input circuit connected to an antenna system 11, 11. Coupled in cascade with the output circuit of the amplifier 10, in the order named, are an oscillator-modulator 12, an intermediate-frequency amplifier 13 of one or more stages, a composite video-frequency signal detector and automatic-gain-control (A.G.C.) circuit 14, and a signal-translating system 15 comprising a signal-translating network, a control circuit, and a color image-reproducing apparatus 16, all of which are to be described in more detail hereinafter. Generally, the system 15 comprises means for developing from the composite video-frequency signal applied thereto a modified composite video-frequency signal suitable for application to the reproducing apparatus 16 therein. The color image-reproducing apparatus 16 is, for example, of a so-called single electron-gun type as described in the RCA Review article previously referred to and includes conventional beam-deflecting windings 17 as well as auxiliary deflection windings 18, an apertured mask, and an image screen which will be discussed in more detail hereinafter. There is also coupled to the detector 14 a synchronizing-signal separator 19 having output circuits connected through a line-scanning generator 20 and a field-scanning generator 21, respectively, to line-deflection and field-deflection portions of the beam-deflecting windings 17 in the image-reproducing apparatus 16. Another output circuit of the separator 19 is also connected through a pair of terminals 24, 24 and a phase-control circuit 34 to a color wave-signal generator 22, both units 22 and 34 being components of the system 15 and will be described more fully hereinafter.

The output circuit of the A.G.C. supply included in the unit 14 is connected to the input circuits of one or more of the tubes of the radio-frequency amplifier 10, the oscillator-modulator 12, and the intermediate-frequency amplifier 13 in a well-known manner. A sound-signal reproducing unit 23 is also connected to an output circuit of the intermediate-frequency amplifier 13 and may include one or more stages of intermediate-frequency amplification, a sound-signal detector, one or more stages of audio-frequency amplification, and a sound-reproducing device.

It will be understood that the various units thus far described, with the exception of the system 15 and its circuit components including the image-reproducing apparatus 16, may have any conventional construction and design the details of which are well known in the art rendering a further description thereof unnecessary.

*General operation of color-television receiver of FIG. 1*

Considering briefly the operation of the receiver of FIG. 1 as a whole, it is assumed for the moment that the unit 15 includes a conventional color signal-detection unit as generally described in the application referred to above and that the image-reproducing apparatus 16 of the unit 15 is a conventional apparatus for reproducing color images, for example, including three cathode-ray tubes and a dichroic mirror system. A desired modulated color-television wave signal is intercepted by the antenna system 11, 11. The signal is selected and amplified in the radio-frequency amplifier 10 and applied to the oscillator-modulator 12 wherein it is converted into an intermediate-frequency signal. The intermediate-freqency signal is then selectively amplified in the amplifier 13 and applied to the detector 14 wherein its modulation components, including the above-mentioned composite video-frequency signal, are derived. The composite video-frequency signal is applied to the unit 15 through which the color-signal components and the monochrome components are translated in a manner to be explained more fully hereinafter for application to the color image-reproducing apparatus 16 also in a manner to be described more fully hereinafter. The signals applied to the unit 16 modulate the intensity of the electron beam therein in a predetermined manner to be considered more fully hereinafter.

The synchronizing-signal components of the signal derived in the detector 14 are separated from the video-frequency components in the separator 19 and are used to synchronize the operation of the line-scanning and field-scanning generators 20 and 21, respectively. These generators supply signals of saw-tooth wave form which are properly synchronized with reference to the transmitted television signal and which are applied to the deflecting windings 17 of the cathode-ray tube in the unit 16 thereby to deflect the cathode-ray beam of the tube in two directions normal to each other. The beam deflection together with the modulation of the intensity of the electron beam effect, on the screen of the tube, a reproduction of the color image being televised at the transmitter. Synchronizing signals derived in the unit 19 are also applied through the terminals 24, 24 to the color wave-signal generator 22 to synchronize the operation of the latter unit with a similar unit in the transmitter for purposes to be described more fully hereinafter.

The automatic-gain-control or A.G.C. signal derived in the unit 14 is effective to control the amplification of one or more of the units 10, 12, and 13 to maintain the signal input to the detector 14 and to the sound-signal reproducing unit 23 within a relatively narrow range for a wide range of received signal intensities.

The sound-signal modulated wave signal accompanying the desired television wave signal is also intercepted by the antenna system 11, 11 and after amplification in the amplifier 10 and conversion to an intermediate-frequency signal in the unit 12 it is translated through the amplifier 13 to the sound-signal reproducing unit 23. In the unit 23 it is amplified, the sound-signal modulation components are derived therefrom, and the latter components are further amplified and utilized to reproduce the sound by application to the reproducing device in the unit 23 in a conventional manner.

*Description of signal-translating system of FIG. 1*

Referring now in particular to the signal-translating system 15 of FIG. 1 embodying one form of the present invention, this system comprises a circuit for supplying a first signal, specifically a monochrome signal, primarily representative of the visual brightness of a televised image and a second signal, specifically a modulated subcarrier wave signal, effectively multiplex-modulated by signals primarily representative of the chromaticity of the image. Specifically, the last-mentioned circuit includes the circuit connections including the terminals 27, 27 coupled between an output circuit of the detector 14 and input circuits of filter networks 30 and 35 which are part of the unit 15 and have, respectively, pass bands of 2–4 and 0–4 megacycles for applying to the units 30 and 35 the composite video-frequency signal derived in the detector 14.

The signal-translating system 15 also includes the color image-reproducing apparatus 16 for utilizing the above-mentioned first and second signals to reproduce the color image and in which the second signal when applied thereto tends to affect the visual brightness of the reproduced image. Specifically, the apparatus 16 includes a cathode-ray tube having a single electron gun for developing a single electron beam and means including the deflection windings 17 for deflecting the electron beam in two directions normal to each other. The cathode-ray tube also includes a control-electrode and cathode input circuit adapted to have applied thereto a composite video-frequency signal derived from an adder circuit 28. The cathode of the cathode-ray tube is also coupled to a harmonic amplifier 39 for translating a 10.5-megacycle signal and having an input circuit coupled to the generator 22. Additionally, the apparatus 16 includes the auxiliary deflection windings 18 coupled to the cathode-ray tube and connected to an output circuit of the color wave-signal generator 22 through a pair of terminals 33, 33 for deflecting the electron beam in the cathode-ray tube in such a manner as to effect a symmetrical demodulation of the color-signal components of the multiplex-modulated subcarrier wave signal applied to the cathode-ray tube as a part of the composite video-frequency signal. As described in the June 1950 RCA Review article previously mentioned, the windings 18 are proportioned with respect to each other so that quadrature currents are developed in the two windings to effect the desired deflection. As previously mentioned, such a tube includes an image screen 25 on which is arranged an orderly array of small, closely spaced dots in triangular groups each group comprising dots individually responsive to signals representative, respectively, of the green, red, and blue colors of an image. Interposed between the screen 25 and the electron gun in the tube is an apertured mask 26 having a plurality of holes therein individual ones of which are positioned in register with individual triangular groups of color dots on the screen 25.

The signal-translating system also comprises a signal-translating network 38 responsive at least to the aforementioned second signal and including a detector arrangement for deriving therefrom a correction signal representative of that component of the second signal which tends to affect the visual brightness of the reproduced image. More specifically, the network 38 includes a signal-translating channel coupled between the terminals 27, 27 and the adder circuit 28 and comprising in cascade, in the order mentioned, a band-pass filter network 30 preferably having a pass band of 2–4 megacycles, a synchronous detector 31, and a filter network 32 preferably having a pass band of 0–2 megacycles. The networks 30 and 32 may be of conventional construction. The detector 31 is of a type more fully described in the aforementioned application Serial No. 159,212 and is arranged to develop in the output circuit thereof by the heterodyning of the signals applied thereto a signal having frequencies representative of the beat frequency of a signal related to the locally developed wave signal applied to the unit 31 from the generator 22 and the side bands of the modulated subcarrier wave signal translated through the unit 30.

The network 38 also includes the color wave-signal generator 22 having an input circuit coupled through the phase-control circuit 34 to the input terminals 24, 24 and having an output circuit coupled to the terminals 33, 33. The unit 22 also has an output circuit coupled through a phase-delay circuit 40 and a voltage divider 41 to an input circuit of the detector 31. The unit 40 is proportioned to effect a delay of 103° for the signal translated therethrough for reasons which will be explained more fully hereinafter. The color wave-signal generator 22 is essentially a sine-wave signal generator for developing at the receiver a wave signal representative of the subcarrier wave signal at the transmitter. For this reason, the phase and frequency of the developed signal are controlled by a synchronizing signal applied to the phase-control circuit 34. The frequency of the signal developed in the generator 22 is substantially 3.5 megacycles in a system wherein the subcarrier wave signal is a 3.5-megacycle signal. The voltage divider 41 is adjusted as will be explained more fully hereinafter to apply from the generator 22 a signal of such intensity to control the gain of the detector 31 so that the gain of the channel including the detector 31 is 0.92 of the gain of the channel including a filter network 35. The units 22, 31, and 40, together with the voltage divider 41, comprise a detector arrangement for deriving the aforementioned correction signal, the composition of which will be considered more fully hereinafter.

The signal-translating system 15 also comprises a control circuit coupled to the network 38, the aforementioned supply circuit, and the apparatus 16 effectively for applying the first or monochrome signal, the second or modulated subcarrier wave signal, and the correction signal to the image-reproducing apparatus 16. Specifically, this control circuit comprises between the pair of terminals 27, 27 and the pair of terminals 29, 29, in cascade in the order named, the filter network 35 preferably having a pass band of 0–4 megacycles and the adder circuit 28. The unit 28 is effectively a signal-combining device for translating the composite video-frequency signal while adding the monochrome signal and the correction signal as will be explained more fully hereinafter. Adder circuits, such as represented by the unit 28, are of conventional construction and may, for example, comprise a plurality of vacuum tubes having individual input circuits and common output circuits. The circuit including the units 35 and 28 and the network 38 comprises a signal-translating arrangement.

*Operation of signal-translating system of FIG. 1*

Before discussing in detail the operation of the system 15, it will be helpful to give some consideration to the problem which the system is intended to solve. As more fully explained in the application Serial No. 159,212, previously referred to herein, the signals developed in the transmitter of a system designed for constant luminance transmission are properly proportioned with respect to one another in order to take advantage, at the receiver, of the unequal sensitivity of the human eye to the brightness effects of the different primary colors, thereby to effect cancellation of any visual brightness effects contributed by the color signals. In a constant luminance transmission system it is desired that the modulated subcarrier wave signal and its modulation components should not affect the visual brightness of the image but should contribute only chromaticity information. In one form of a receiver in a constant luminance system, as considered in the application just referred to, the signals representative of the different primary colors are individually proportioned at the receiver in a manner complementary to the proportioning at the transmitter by translating the color signals through different channels individually having gains in proportion to the brightness effects on the eye of the primary colors represented by the signals translated therethrough, thereby to effect cancellation in the reproduced image of any brightness effects which the color signals tend to produce. Other arrangements to effect the same result include cross-coupling circuits between the channels for mixing the different color signals thereby effectively to control the gain thereof to effect the above-mentioned desired result. Specifically, one cross-coupling arrangement described in the aforementioned application consists in deriving the color-signal components from the modulated subcarrier wave signal in such a manner as to effect the desired amount of gain control for the different color-signal components by utilizing the desired amount of cross-coupling of these signals. The last-mentioned arrangement has been designated as an asymmetrical sampling arrangement since the device for deriving the color-signal components, instead of deriving these components in a symmetrical manner from equally spaced phase points of the modulated subcarrier wave signal and with equal gains, is arranged to derive the components at unequally spaced phase points and with unequal gains so that there is effectively a mixed or composite color-signal component derived at the different phase points.

A single gun color tube as previously described herein conventionally includes an arrangement for symmetrically deriving the color signals in the form of narrow pulses and is designed directly to utilize the composite video-frequency signal to develop the color image therefrom. In other words, the derivation of the information from the composite video-frequency signal is accomplished within the envelope of the cathode-ray tube. It may be difficult to accomplish the above-described asymmetrical derivation in such a color tube due to the difficulty in separating the color and brightness information within the tube envelope. Therefore, if such a color tube is to be utilized in a constant luminance system, the composite video-frequency signal to be applied to the color tube should have such composition that the color signals may be derived symmetrically within the color tube and utilized to reproduce with desired fidelity the color image on the screen of the tube. The signal-translating system, in accordance with the present invention, develops such a composite video-frequency signal and utilizes circuits similar to those described in the aforementioned application Serial No. 159,212 to effect the constant luminance correction at the receiver.

Considering now in detail the operation of the unit 15 of FIG. 1, as previously mentioned herein, a composite video-frequency signal is derived in the detector 14 and applied to the terminals 27, 27 of the unit 15. As explained more fully in the above-mentioned application Serial No. 159,212, such composite video-frequency signal includes a first or monochrome signal Y primarily representative of the visual brightness of a televised color image and which, for a given system, may be defined as follows:

$$Y=0.67G+0.30R+0.03B \qquad (1)$$

where G, R, and B represent, respectively, the green, red, and blue color signals. The composite video-frequency signal also includes a second signal effectively including as modulation components signals $g_1$, $r_1$, and $b_1$ primarily representative of the chromaticity of the image where:

$$g_1=h(G-Y) \quad (2)$$

$$r_1=\frac{R-Y}{n} \quad (3)$$

$$b_1=\frac{B-Y}{p} \quad (4)$$

The first or monochrome signal Y has a band width of substantially 0–4 megacycles and the 3.5-megacycle subcarrier wave signal modulated by the 1.5-megacycle signals $g_1$, $r_1$, and $b_1$ has substantially a 2–4 megacycle band width and is interleaved in frequency with the signal Y in the common pass band. The coefficient $h$, $1/n$, and $1/p$ are gain factors introduced at the transmitter for the signals $g_1$, $r_1$, and $b_1$, respectively, and, as described in the aforementioned application, are related to the brightness effects produced by the selected primary colors green, red, and blue respectively.

The composite video-frequency signal to be applied to the control electrode-cathode circuit of the cathode-ray tube in the apparatus 16, as considered more fully in the RCA Review article previously mentioned, should have a monochrome signal M defined as follows:

$$M=0.33G+0.33R+0.33B \quad (5)$$

and a subcarrier wave signal effectively including as modulation components color-signal components $g_m$, $r_m$, $b_m$ defined as follows:

$$g_m=0.67G-0.33R-0.33B \quad (6)$$

$$r_m=0.67R-0.33G-0.33B \quad (7)$$

$$b_m=0.67B-0.33G-0.33R \quad (8)$$

Thus, in order to utilize the signals defined by Equations 1–4, inclusive, to reproduce a desirable image in a reproducing device which normally utilizes signals defined by Equations 5–8, inclusive, some modification of the first-mentioned signals should be effected. Additionally, if the constant luminance effects are to be obtained in the receiver, the signals defined by Equations 2–4, inclusive, at least effectively should individually be translated through channels having gains which are the reciprocals of the aforementioned gain factors $h$, $1/n$, and $1/p$.

Consideration of the signals defined by Equations 1–4 ,inclusive, indicates that, for the signal compositions under consideration, a correction signal can be derived from a subcarrier wave signal modulated by the signals defined by Equations 2–4, inclusive, which when added to the Y signal defined by Equation 1 effectively causes the latter signal to become the M signal defined by Equation 5 and, more important, effectively causes the signals defined by Equations 2–4, inclusive, to become signals such as defined by Equations 6–8, inclusive, while at the same time effectively causing the signals defined by Equations 2–4, inclusive, to be amplified by the reciprocals of the factors $h$, $1/n$, and $1/p$, respectively. Thus, a receiver utilizing such a correction signal retains the constant luminance characteristic of the chromaticity signals. The details of such a correction signal and its manner of derivation will now be considered.

If the Equations 2–4, inclusive, are expanded by substituting therein the value of Y as defined by Equation 1 and signals defined by these equations are individually translated, respectively, through channels having the last-mentioned gain factors, the following signals, specifically color-difference signals, suitable for combination with the Y signal to effect a constant luminance reproduced image are developed:

$$g=0.33G-0.30R-0.03B \quad (9)$$

$$r=0.70R-0.67G-0.03B \quad (10)$$

$$b=0.97B-0.67G-0.30R \quad (11)$$

The signals defined by Equations 9–11, inclusive, at least effectively should be derived in the derivation operation performed in the image-reproducing apparatus 16 if fidelity of reproduction and constant luminance of the chromaticity signals are to be obtained. However, as has been mentioned, the signals defined by Equations 6–8, inclusive, are effectively derived in a device such as that of the unit 16. If a correction signal, which is defined as the signal which when added to the Y signal will develop the M signal, is effectively added to the derived signals, as defined by Equations 6–8, inclusive, the desired signals defined by Equations 9–11, inclusive, are effectively derived. Consequently, the reproduced image in such case is substantially a faithful one and the chromaticity signals affect only the color of the image and not the brightness thereof. The composition of the correction signal, determined by subtracting the terms in Equation 1 from those in Equation 5, as defined as follows:

$$M-Y=-0.34G+0.03R+0.30B \quad (12)$$

As an example of the correcting effect of the signal $M-Y$, when this signal is combined with the signal $g_m$ defined by Equation 6, the desired color-difference signal $g$ defined by Equation 9 is developed. Thus:

$$g=g_m+M-Y \quad (13)$$

Solution of Equation 13 in terms of Equations 9 and 12 will prove the validity thereof. In a similar manner, the signals $r_m$ and $b_m$ become the desired color-difference signals, respectively, $r$ and $b$ by combining the correction signal $M-Y$ with each of the signals $r_m$ and $b_m$.

The correction signal $M-Y$ may be derived from the modulated subcarrier wave signal at a predetermined phase point thereof, this point being essentially determined by the proportions of the G, R, and B color signals which combine to develop the correction signal. If, as in the quadrature form of system previously discussed and more fully described in the copending application Serial No. 159,212, the $r_1$ and $b_1$ signals defined by Equations 3 and 4 modulate the subcarrier wave signal in quadrature phase, for example, at the phase points 180° and 270°, respectively, while the signal $g_1$ is substantially 180° out-of-phase with the signal $r_1$, the composition of a signal derived at any phase point on the subcarrier is determined by the relative amounts of the $r_1$ and $b_1$ signals at that point. In other words, at points other than the proper quadrature points or points 180° out-of-phase therewith, there is effectively a composite modulation signal including portions of the $r_1$ and $b_1$ signals. The compositions of the signals $r_1$ and $b_1$ are more fully defined by substituting in Equations 3 and 4, respectively, the value of Y defined by Equation 1 assuming the gain factors $1/n$ and $1/p$ to be 1/1.12 and 1/2.75, respectively. Thus:

$$r_1=-0.60G+0.62R-0.03B \quad (14)$$

$$b_1=-0.24G-0.11R+0.35B \quad (15)$$

The correction signal $M-Y$ may then be defined in terms of the proportions of $r_1$ and $b_1$ signals as follows:

$$kr_1+cb_1=M-Y=-0.34G+0.03R+0.30B \quad (16)$$

where $k$ and $c$ are the proportionality factors, in other words, the factors by which the peak amplitudes of the $r_1$ and $b_1$ signals should be modified or proportioned to obtain the desired proportioning of the color signals G, R, and B to be combined to develop the correction signal. The values of the factors $k$ and $c$ are determinable from Equations 14–16, inclusive as:

$$k=0.21 \quad (17)$$

$$c=0.90 \quad (18)$$

With the signals $r_1$ and $b_1$ at the phase points 180° and 270°, respectively, of the subcarrier wave signals, the phase angle $\phi$ at which the correction signal $M-Y$ may be derived with respect to the angle 180° is defined as follows:

$$\phi=\sin^{-1}\left(\frac{0.90}{0.21}\right)=77° \quad (16)$$

Consequently, the proper angle for deriving the correction signal is the phase angle 180° of the signal $r_1+77°$ or 257°.

Having determined the angle of derivation, it is then necessary also to determine, with respect to the channel for translating the signal Y, the gain I of the channel including the detector 31 in order that the proper portions of the $r_1$ and $b_1$ signals are combined to develop the $M-Y$ correction signal to be combined with the signal Y. The gain I by vector addition of the magnitudes defined by Equations 17 and 18 is defined as follows:

$$I=\sqrt{0.90^2+0.21^2}=0.92 \qquad (20)$$

Thus, the correction signal is derived at the phase angle 257° in a detector which has a gain of 0.92 with respect to the gain of the channel for translating the Y signal. To derive the component at the 257° phase point of the subcarrier wave signal, the phase of the signal applied to detector 31 from the generator 22 is +257° or if delayed in phase is −103° with respect to the modulated subcarrier wave signal applied from the network 30 and, as one means of obtaining the proper gain in the channel including the detector 31, the amplitude of the signal applied by the generator 22 to the unit 31 is such as to control the gain of the unit 31 to be approximately 0.92 that of the channel including the unit 35. As a result, the signal translated through the filter network 32 is the correction signal $M-Y$ as defined by Equation 12 and effectively combines in the adder circuit 28 with the monochrome portion of the signal translated through the filter network 35 to develop a monochrome signal which includes a correction factor preventing the chromaticity signals or modulation components of the subcarrier wave signal from affecting the brightness of the image developed in the apparatus 16.

The operation of the units of the system 15 to effect correction of the composite video-frequency signal applied thereto to develop a corrected composite video-frequency signal for utilization in the apparatus 16 will be considered briefly in order to summarize the previous explanation. It is desired to apply to the apparatus 16 a signal such as defined by Equations 5–8, inclusive. A composite video-frequency signal having components as defined by Equations 1–4, inclusive, above is applied to the network 30 and through the network 35 to the adder circuit 28. The signals defined by Equations 2–4, inclusive, are translated through the network 30 and applied to the detector 31. It is desired to derive in the unit 31 a correction signal as defined by Equation 12 effectively to convert the signals defined by Equations 1–4, inclusive, to signals such as defined by Equations 5–8, inclusive. To effect this result, the 3.5-megacycle signal developed in the generator 22 and which, as has previously been explained, is so controlled by the unit 34 as to be in-phase with the subcarrier developed at the transmitter is delayed in phase by 103° as it is translated through the unit 40, and a predetermined intensity thereof, as determined by the voltage divider 41, is applied to an input circuit of the detector 31. The last-mentioned intensity is such that the channel including the detector 31 has a gain of 0.92 of the gain of the channel including the network 35. The 103° delay of the locally generated signal causes it effectively to be 257° in-phase ahead of the modulated subcarrier wave signal. Thus, at this 257° phase point of the modulated subcarrier wave signal there is derived the correction signal defined by Equation 12. This correction signal is translated through the unit 32 and combined in the unit 28 with the composite video-frequency signal defined by Equations 1–4, inclusive, to develop in the output circuit of the unit 28 a desired composite video-frequency signal such as defined by Equations 5–8, inclusive. The latter signal, including the first signal primarily representative of brightness, the second signal primarily representative of chromaticity, and the correction signal, is applied to the intensity control-electrode circuit of the apparatus 16.

The manner of derivation of the color signals in the unit 16 is considered in detail in the RCA Review article previously referred to herein. Briefly, an electron beam is developed in the electron gun of the cathode-ray tube of the unit 16 and directed toward the screen 25 through the apertures in the mask 26. This beam is effectively pulsed from a state of nonconduction to a state of conduction at a rate three times the frequency of the modulated subcarrier wave signal by the 10.5-megacycle signals applied to the cathode from the amplifier 39. The deflection windings 18 have applied thereto a signal related in frequency to the subcarrier wave signal and developed in the generator 22. If the subcarrier wave signal has a frequency of 3.5 megacycles, the signal applied to the beam-rotating windings 18 also has a frequency of 3.5 megacycles and is effective in cooperation with the pulsing of the electron beam by the cathode to derive three color-signal pulses from each cycle of the 3.5-megacycle subcarrier wave signal at three phase points thereof. The signals developed in the windings 18 are effectively the sine and cosine signals of the 3.5-megacycle signal and cause the electron beam to rotate about the axis of its path of travel in a tight spiral. The deflection windings 17 effect the conventional line and field scanning of the screen 25 by the electron beam. The high-frequency spiraling of the electron beam as the beam is translated through each of the apertures in the mask 26 causes the electrons sequentially to impinge on the green, red, and blue color phosphor dots aligned with the aperture in the mask 26 through which the beam is passing. By properly adjutsing the phase and synchronization of the signals applied to the windings 18 with a phase of the modulated subcarrier signal component of the signal applied to the input electrodes of the cathode-ray tube and the pulsing of the beam by the cathode, the beam is caused to fall upon the proper phosphor dot at the time when the electron beam is translating a pulse of intensity information with respect to that color.

The three pulses derived by the sampling operation and applied to the different color dots during each circling of the electron beam individually include the signal M as defined by Equation 5 specifically including the visual brightness signal Y defined by Equation 1 having the correction signal $M-Y$ defined by Equation 12 added thereto and each pulse includes a different one of the signals defined by Equations 6–8, inclusive, derived at the 0°, 120°, and 240° phase points of the subcarrier wave signal instead of the signals defined by Equations 9–11, inclusive, which would be derived at other phase points of the subcarrier wave signal. The proportioning of the signals continues to be such as to cause the signals defined by Equations 6–8, inclusive, to contribute only to the color of the image. Each of the latter signals is effectively combined with the M signal to comprise the G, R, B color signals. Consequently, a pulse representative of green information effectively intensity-modulates the electron beam when the beam is impinging on the phosphor which reproduces green and similar effects occur sequentially with respect to the phosphors which reproduce red and blue.

The signal-translating system 15 of FIG. 1 is one in which a correction signal $M-Y$ to be combined with the Y signal is developed. In such a system the composition of the subcarrier wave signal is not modified. Nevertheless, as a result of the correction operation in the image-reproducing apparatus 16, the signal-translating system of FIG. 1 is one in which the constant luminance characteristics of the composite video-frequency signal applied to the system 15 are retained while the modulation components of the subcarrier wave signal are symmetrically derived by the deriving means in the apparatus 16. Thus, the benefits of the constant luminance system are retained while utilizing a single gun color tube employing symmetrical sampling. In other words, the monochrome signal Y is effective primarily to determine the visual brightness of the reproduced image, the subcarrier wave signal is effective primarily to determine the chromaticity of the image, and the correction signal $M-Y$ is effective substantially to cancel any brightness which the wave signal tends to produce. As will be considered hereinafter, in some cases in order to effect the desired constant luminance with correct chromatic rendition, the composition of the subcarrier wave signal may require modification.

Figure 2:
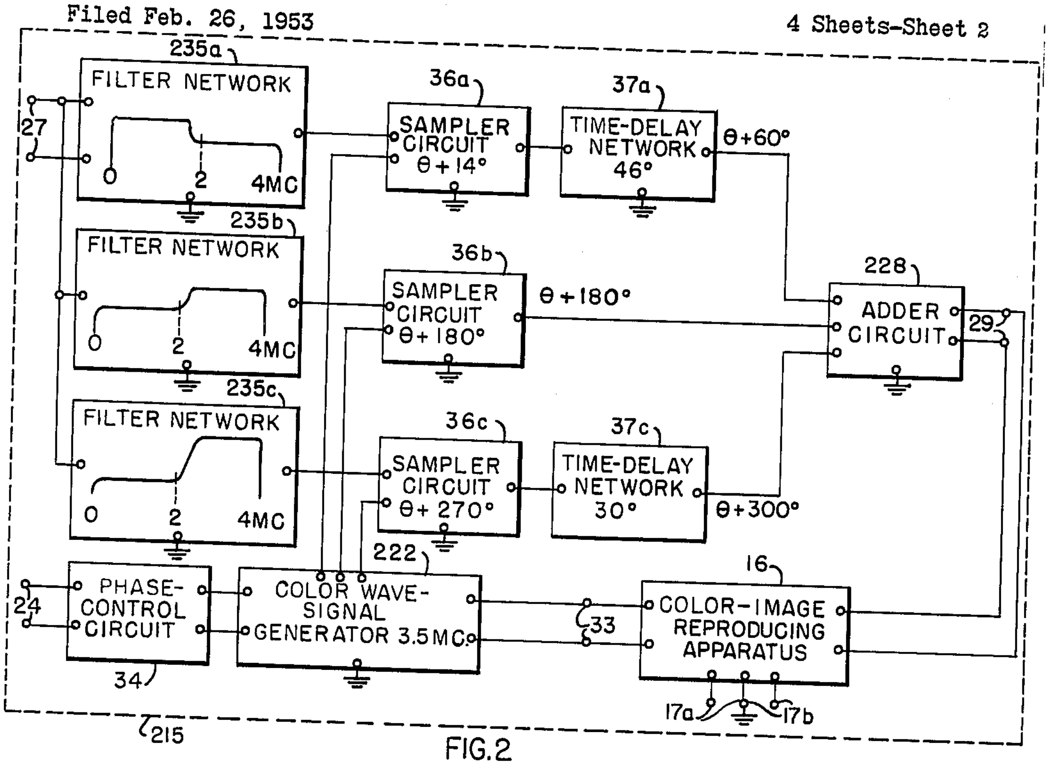

*Description of signal-translating system of FIG. 2*

For some purposes, it may be desirable to utilize a signal-translating system which analyzes an asymmetrical type of signal in the proper asymmetrical fashion to derive the components thereof and then to recombine these components into a symmetrical type of signal suitable for utilization in an image-reproducing apparatus such as the unit 16 of FIG. 1. The system of FIG. 2 is designed to effect such analysis and synthesis. Though the system of FIG. 2 differs from the system described with respect to FIG. 1, some of the units in the system of FIG. 2 perform functions analogous to corresponding units in the system of FIG. 1 and are, therefore, designated by the same reference numerals as the corresponding units with a prefix of "2."

The signal-translating system of FIG. 2 includes a plurality of signal-translating channels comprising a detector arrangement, these channels being coupled in parallel between the input circuit including the terminals 27, 27 and the adder circuit 228. One of the signal-translating channels includes, in cascade, a filter network **235*a* a sampler circuit 36*a*, and a time-delay network 37*a*, another includes, in cascade, a filter network 235*b* and a sampler circuit 36*b* while a third includes, also in cascade, a filter network 235*c*, a sampler circuit 36*c*, and a time-delay network 37*c***.

The filter networks **235*a*–235*c*, inclusive, preferably have 0–4 megacycle pass bands and are proportioned to have nonuniform attenuation characteristics, the nonuniformity being determined by the composition of the composite video-frequency signal applied to the unit 215, more specifically being determined by the reciprocal of the gain factors $h$, $1/n$, and $1/p$ previously considered where, for example, these factors are, respectively, 2, 1/1.12, and 1/2.75 for a given set of primary colors. For example, the network 235*a*, in the embodiment described herein, is proportioned to translate signals of lower frequencies, specifically of 0–2 megacycles, with negligible attenuation while the signals having a frequency range of 2–4 megacycles and including the modulated subcarrier wave signal are translated therethrough with a much higher attenuation, the difference in attenuation being of the order of 6 db or the reciprocal of the gain factor 2. The filter network 235*b* is proportioned to translate the 0–2 megacycle signals with more attenuation than the modulated subcarrier wave signal in the frequency of 2–4 megacycles, for example, the difference in attenuation being of the order of 1 db or the reciprocal of the gain factor 1/1.12. The filter network 235*c*** is proportioned to translate the modulated subcarrier wave signal with less attenuation than the lower frequency 0–2 megacycle signals, the difference in attenuation being of the order of 9 db or the reciprocal of the gain factor 1/2.75.

The sampler circuits **36*a*–36*c*, inclusive, effectively are high-speed gating circuits for individually translating gated portions or pulses of the modulated subcarrier wave signal and of the 0–2 megacycle low-frequency monochrome components. The sampler circuits 36*a*–36*c*, inclusive, have coupled to input circuits thereof individual ones of the output circuits of the generator 222. The output circuit of the unit 222 coupled to the sampler 36*a* is proportioned to delay the phase of the signal developed in the generator with respect to a reference phase $\theta$ of the subcarrier wave signal by approximately 14°. Similarly, the output circuits of the unit 222 coupled to the sampler circuits 36*b* and 36*c*** are proportioned to delay the generated signal by phase angles of 180° and 270°, respectively, with respect to the reference phase $\theta$.

The time-delay networks **37*a* and 37*c* are proportioned to delay the pulse signals derived in the units 36*a* and 36*c*, respectively, by 46° and 30° for signals at the frequency of the subcarrier wave signal. The adder circuit 228 is similar to the circuit 28** described with reference to FIG. 1 except that it includes three separate input circuits and the one common output circuit.

*Operation of signal-translating system of FIG. 2*

Considering now the operation of the signal-translating system of FIG. 2, it should be understood that it is the purpose of this system to modify a composite video-frequency signal applied to the terminals 27, 27 and having components, as defined by Equations 1–4, inclusive, above, to a composite video-frequency signal in the output circuit of the adder circuit 228 substantially having components as defined by Equations 5–8, inclusive, above. Briefly, this modification of the composite video-frequency signal is effected by analyzing the latter signal in the manner in which it was intended to be analyzed in a constant luminance receiver and then recombining the components developed by such analysis into a composite video-frequency signal which retains the constant luminance characteristic of the original composite video-frequency signal and which is suitable for utilization in the image-reproducing apparatus 16. Thus, the signal $g_1$ defined by Equation 2 and which is modulation component of the subcarrier wave signal is effectively translated through the network **235*a* with other signals so as to have the gain factor of 2 canceled therefrom. This is effected by causing the attenuation of the subcarrier wave signal to be substantially twice the attentuation of the other signals translated through the network 235*a*. Similarly, the networks 235*b* and 235*c* correct for the gain factors present in the signals defined by Equations 3 and 4, respectively, above. Thus, the subcarrier wave signals supplied to the sampler circuits 36*a*–36*c***, inclusive, are properly controlled in amplification to effect the constant luminance relationship considered above and in the copending application Serial No. 159,212.

The signal-translating system 215 of FIG. 2 is designed to operate in a system wherein the modulation components $g$, $r$, $b$ defined by Equations 9–11, inclusive, above occur respectively at the phase points of 14°, 180°, and 270°. Thus, the sampler circuits **36*a*–36*c*, inclusive, under the control of the signals applied thereto from the generator 222 effectively translate therethrough at the phase points of 14°, 180°, and 270°, respectively, of the subcarrier wave signal, narrow pulses of the signals applied to these sampler circuits from the units 235*a*, 235*b*, and 235*c*, respectively. These narrow pulses have amplitudes proportional to the G, R, and B signals and include both the monochrome signal and the proper portions of the subcarrier wave signal but have time relationships representative of the phase relationships of 14°, 180°, and 270°. In order to utilize such signals in the image-reproducing apparatus 16, these pulses should be equally spaced in time equal to the time intervals of 120° phase points of a cycle of the subcarrier wave signal. Therefore, the signal translated through the time-delay network 37*a* is delayed by 46° in phase at the frequency of the subcarrier wave signal and the signal translated through the network 37*c* is delayed by 30° in phase at the same frequency. Consequently, the signals applied to the different input circuits of the adder circuit 228 have such relationships in time that they are effectively separated by 120° intervals of a cycle of the subcarrier wave signal. Therefore, the composite video-frequency signal developed in the adder circuit 228 by the combination of the three input signals is one in which the color signals occur at 120° intervals of the subcarrier wave signal. Consequently, such composite video-frequency signal may be applied through the terminals 29, 29 to an image-reproducing apparatus such as the unit 16** of FIG. 1 for utilization therein.

*Description of signal-translating system of FIG. 3*

The units 38, 35, and 28 of FIG. 1 are effective to provide a composite video-frequency signal which may be used in an image-reproducing apparatus such as the unit 16 of FIG. 1 and which retains the constant luminance characteristic of the composite video-frequency signal applied to the unit 15. However, since the unit 15 is designed primarily to develop a correction signal which is to be combined with the brightness signal Y and the composition of the subcarrier wave signal is assumed to be correct for the system and, thus, remains unmodified, it may be desirable to improve the unit 15 so that it may be useful when the composition of the subcarrier wave signal requires modification. The signal-translating system 315 of FIG. 3, though similar to the system 15 of FIG. 1, is designed not only to develop the constant luminance correction signal for addition to the brightness signal but also is designed to modify the composition of the subcarrier wave signal, whenever desirable, to minimize any tendency to develop chromaticity errors. In view of the similarity of the systems of FIGS. 1 and 3, corresponding units are designated by the same reference numerals and analogous units by the same reference numerals with a prefix of "3."

The signal-translating system 315 of FIG. 3 includes, in cascade, in one of the parallel circuits coupled between the terminals 27, 27 and the adder circuits 28, a synchronous modulator 52 and a 0–4 megacycle filter network 335. The network 335 may have either a uniform or a nonuniform signal-translating characteristic depending upon the signals to be translated through this network. In the embodiment under consideration, the network 335 has a nonuniform signal-translating characteristic effectively attenuating the 0–2 megacycle signals by 3 db with respect to the 2–4 megacycle signals. The details of the synchronous modulator 52 will be considered more fully when considering the generator 322 hereinafter.

The system 315 also includes a color wave-signal generator 322 having an output circuit coupled through a harmonic-signal amplifier 45, a phase-delay circuit 47, and a voltage divider 48 to an input circuit of the synchronous modulator 52. The amplifier 45 may be of a conventional type for developing a second harmonic of the 3.5 megacycle signal developed in the unit 322. For effecting a predetermined control of the operation of the synchronous modulator 52, as will be explained more fully hereinafter, the voltage divider 48 is adjusted to control the intensity of the signal applied to the modulator 52. The unit 47 has a phase delay for causing the signal applied from the unit 45 to the unit 52 to have a predetermined phase relationship with respect to the received subcarrier wave signal applied to the modulator 52. Specifically, for reasons to be explained more fully hereinafter, the voltage divider 48 is so adjusted that the intensity of the signal developed in the output circuit of the amplifier 45 is such as to cause the gain of the modulator 52 for beat-frequency signals to be 0.33 of what the gain is for translation of the fundamental signal applied thereto from the amplifier 45. The unit 47 is arranged to delay the signal translated therethrough by 160° so that the signal applied from the amplifier 45 to the modulator 52 has a phase of approximately +194° with respect to a phase of the subcarrier wave signal. Except for the characteristics of the signals applied thereto and the utilization of the signal applied from the amplifier 45 to control the gain thereof, the synchronous modulator 52 may be a conventional type of modulator.

In the system of FIG. 3, the units 30, 31, 32, 40, 41, and 322 comprise the previously mentioned signal-translating network while the units 28, 52, and 335 comprise the aforementioned control circuits.

*Operation of signal-translating system of FIG. 3*

The units 30–32, inclusive, 34, 40, 41, and 322 function in a manner similar to that of the corresponding units of FIG. 1 to develop the correction signal $M-Y$, as defined by Equation 12. This correction signal is applied to an input circuit of the adder circuit 28.

The modulator 52 operates effectively to shift the phase and vary the amplitude of the modulated subcarrier wave signal applied thereto from the terminals 27, 27 and which should be asymmetrically sampled so that it is effectively remolded into a signal in the output circuit of the unit 52 which is a subcarrier wave signal capable of being symmetrically sampled. This operation is obtained by causing the applied modulated subcarrier wave signal having a frequency of 3.5 megacycles to heterodyne with an unmodulated 7 megacycle wave signal developed in the amplifier 45 and applied through the unit 47 and the voltage divider 48 to another input circuit of the modulator 52. The heterodyning of these signals is effective to develop a resultant 3.5-megacycle signal having the modulation components symmetrically disposed thereon.

Figure 3C:
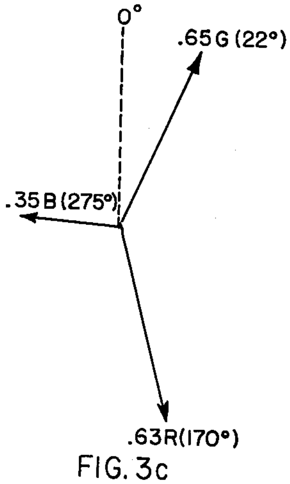
Figure 3A:
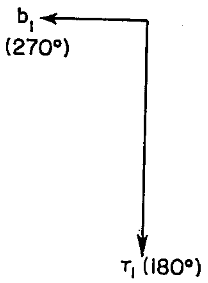
Figure 3D:
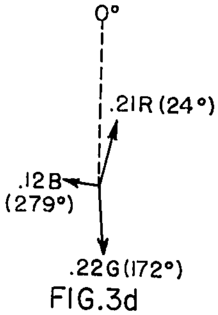
Figure 3B:
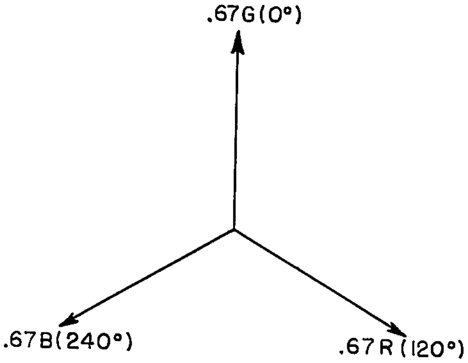

To understand the development of this resultant signal, it will be helpful to consider the vector diagrams of FIGS. 3*a*–3*e*, inclusive. The diagram of FIG. 3*a* vectorially represents the phase angles and relative intensities of the $r_1$ and $b_1$ modulation components of the subcarrier wave signal applied by means of the terminals 27, 27 to the modulator 52. As explained previously, the $r_1$ and $b_1$ components defined by Equations 3 and 4 above are independent modulation components while the $g_1$ signal defined by Equation 2 is determined by the relative amounts of the $r_1$ and $b_1$ components at the phase angle at which the $g_1$ component is derived from the subcarrier wave signal. Also, as explained previously, it is desired to derive from the subcarrier wave signal at 120° phase intervals the color-difference signals $g_m$, $r_m$, and $b_m$ as defined by Equations 6–8, inclusive. The angular relationships and relative intensities of the latter signals, expressed in terms of the color signals G, R, and B, are vectorially represented by FIG. 3*b*. FIG. 3*c* represents the angular relationships and relative intensities of the color signals G, R, and B as disposed on the subcarrier wave signal applied to the unit 52. The information for developing FIG. 3*c* is obtainable by considering the relative proportions of the signals G, R, and B in the components $r_1$ and $b_1$ as defined by Equations 3 and 4, assuming $n$ to be 1.12 and $p$ to be 2.75. It is apparent that the subcarrier wave signal having the G, R, and B signals, as represented by the vectors of FIG. 3*c*, differs from the desired subcarrier wave signal having the signals G, R, and B, as represented by the vectors of FIG. 3*b*. In order to modify the subcarrier wave signal applied to the unit 52 to one having the signals G, R, and B symmetrically disposed as components thereof, a 3.5 megacycle beat signal is developed in the unit 52 by the heterodyning of the 7-megacycle signal applied thereto from the amplifier 45 and the 3.5-megacycle subcarrier wave signal applied thereto from the terminals 27, 27. This beat signal, having the same frequency as the subcarrier wave signal but, due to the reversal caused by the heterodyning, having the components G, R, and B in a sequence opposite to that of the applied subcarrier wave signal, combines with the latter signal to develop a resultant subcarrier wave signal. The manner of this combination and of the development of the beat signal will now be discussed in more detail.

Figure 3E:
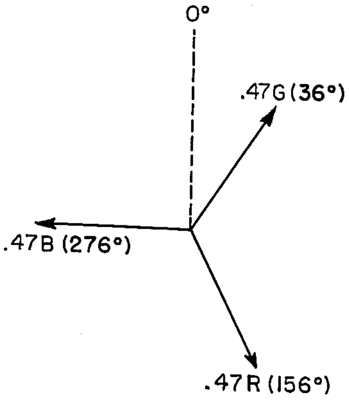

A comparison of the relative phases and intensities of corresponding ones of the vectors representing the signals G, R, and B in FIGS. 3*b* and 3*c* determines the phases and intensities of the signals G, R, and B in the beat signal which are desired in order that the beat signal combine with the applied subscarrier signal to develop the desired resultant signal. The relative phases and intensities of the G, R, and B signals of the beat signal are vectorially represented by FIG. 3*d*. Adding of the vectors of FIGS. 3*c* and 3*d* results in vectors such as represented by FIG. 3*e*, the latter vectors representing the relative phases and intensities of the signals G, R, and B in the desired resultant signal developed in the output circuit of the synchronous modulator 52. In order that the intensities of the latter G, R, and B signals with respect to the intensity of the monochrome signal be such as represented by the vectors of FIG. 3*b*, the resultant subcarrier wave signal is effectively boosted with respect to the monochrome signal by approximately 3 db. This is effected when the signals are translated through the filter network 335, the latter having a non-uniform frequency-response characteristic such that the 2–4 megacycle signals are boosted by 3 db with respect to the 0–2 megacycle signals. As a result, the subcarrier wave signal applied to the adder circuit 28 from the unit 335 has the signals G, R, and B as modulation components thereof with the relative intensities and phases as represented by the vectors of FIG. 3*b*. It should be understood that the brightness signal Y or at least the lower frequency portion thereof is also translated without modification through the units 52 and 335.

As mentioned above, the desired beat signal should have G, R, and B components with the relative intensities and phases as represented by the vectors of FIG. 3*d*. In order to obtain a beat signal having such composition for the specific example under consideration, there is applied to the modulator 52 from the amplifier 45 a 7-megacycle signal having a phase of approximately +194° with respect to a 0° reference phase. This is effected by delaying the phase of the applied signal by 166° in the unit 47. A signal so delayed is 194° in phase ahead of the next cycle of the subcarrier wave signal. This 194° phase angle is measured with respect to a 0° phase angle of the 3.5-megacycle subcarrier wave signal and, thus, would be half such phase angle or 97° for the 3.5-megacycle signal from the same reference phase. Additionally, in order that the G, R, and B signals have the proper intensities in the best signal, the phase-delayed 7-megacycle signal is controlled by the voltage divider 48 to be of such intensity as to control the gain of the modulator 52 so that for the beat-frequency signal it has substantially 0.33 times the gain of the modulator for the translation therethrough of the applied 3.5-megacycle signal. Briefly, to summarize the reasoning by which the intensity and phase of the 7-megacycle signal with respect to the subcarrier wave signal are determined, the composition necessary for the beat signal to combine with the subcarrier wave signal applied to modulator 52 to develop the desired resultant signal determines the phasing and intensity of the 7-megacycle signal. The composition of the beat signal is determined by considering the difference in the compositions of the applied subcarrier wave signal and the desired subcarrier wave signal. The beat signal then represents this difference and when combined with the applied subcarrier wave signal modifies it or remolds it to become the resultant subcarrier wave signal.

The subcarrier wave signal and the brightness signal Y applied to the adder circuit 28 from the unit 335 combine therein with the $M-Y$ correction signal applied to the unit 28, as previously explained herein, to form a composite video-frequency signal. The composite video-frequency signal may then be translated through the terminals 29, 29 and applied to the image-reproducing apparatus 16 for utilization therein to develop a color reproduction of the televised image. Though the subcarrier wave-signal component of the signal developed in the output circuit of the unit 28 is of such composition as to permit sampling of the color signals at 120° phase points, these phase points may not be the conventional 0°, 120°, and 240° phase points with respect to the reference phase $\theta$ in view of the phase modification occurring in the network 315. In the example under consideration, due to such phase delays, the sampling would occur at approximately 36° for green, 156° for red, and 276° for blue with respect to the reference phase $\theta$.

Figure 4:
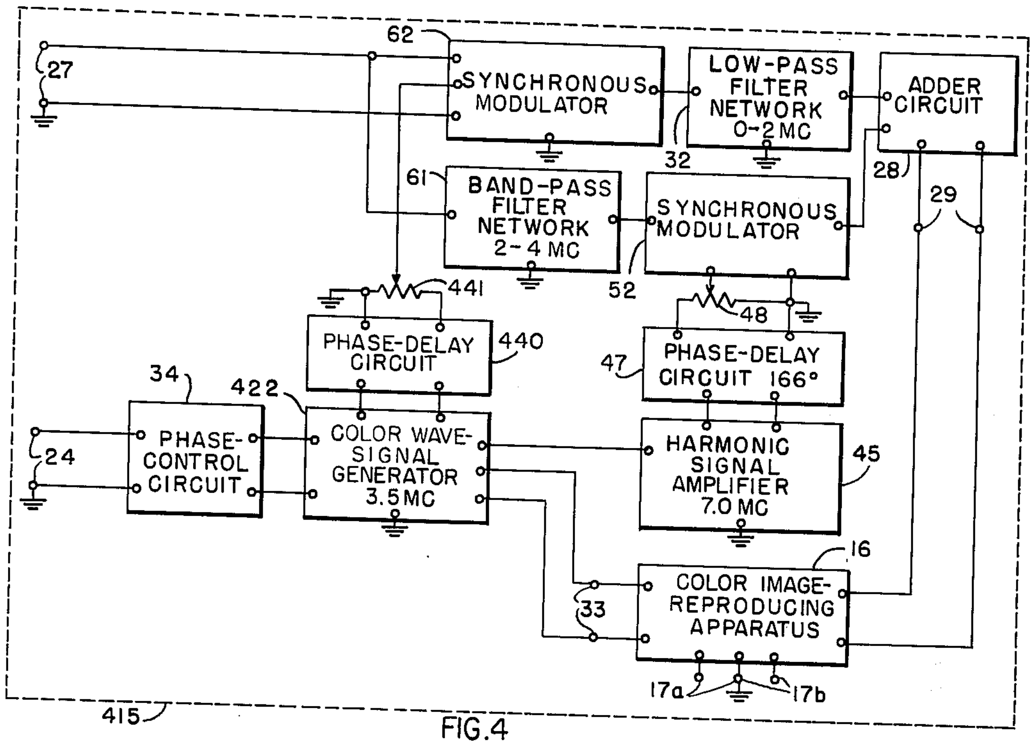

*Description and operation of signal-translating system of FIG. 4*

It may sometimes be desirable directly to effect the correction of monochrome signal in the monochrome channel instead of, as in FIG. 3, developing a correction signal which is then added to the monochrome component to effect the correction thereof at some other point in the network. FIG. 4 represents a signal-translating system for effecting such result.

The signal-translating system of FIG. 4, insofar as the individual units thereof are concerned, is very similar to that of FIG. 3 and, therefore, similar units are designated by the same reference numerals and analogous units by the same reference numerals with a prefix of "4" or, where applicable, by replacing the prefix of "3" for a unit in FIG. 3 by a prefix of "4" for the analogous unit in FIG 4. In the signal-translating system 415 of FIG. 4 a synchronous modulator 62 is utilized instead of the synchronous detector 31 in the FIG. 3 system. In addition, a 2–4 megacycle band-pass network 61 coupled between the terminals 27, 27 and an input circuit of the synchronous modulator 52 permits only the 2–4 megacycle portion of the composite video-frequency signal to be applied to the modulator 52. The adder circuit 28 is arranged to combine the resultant subcarrier wave signal developed in the unit 52 and the corrected 0–2 megacycle monochrome component translated through the filter network 32.

In the signal-translating system 415 a locally generated signal synchronous with the subcarrier wave signal generated at the transmitter and at a proper phase with respect to a reference wave of the modulated subcarrier wave signal is applied to the unit 62 from the generator 422 to heterodyne with the modulated subcarrier wave signal effectively to develop a correction signal such as defined by Equation 12 above. The correction signal has 0–2 megacycle components which add in the unit 62 to the 0–2 megacycle components applied to the unit 62 from the terminals 27, 27 to develop therein the corrected 0–2 megacycle monochrome signal defined by Equation 5. The manner in which the amplitude and phase of the signal applied to the unit 62 from the generator 422 and controlled by the voltage divider 441 and the unit 440, respectively, is related to the amplitude and phase of the modulated subcarrier wave signal applied to the unit 62 to obtain the desired correction signal has been considered with reference to the embodiments of FIGS. 1 and 3. The corrected 0–2 megacycle monochrome signal is translated through the unit 32 and applied to an input circuit of the adder circuit 28.

A resultant subcarrier wave signal of the type described with reference to FIG. 3 is developed in the modulator 52 and applied to another input circuit of the adder circuit 28. The corrected 0–2 megacycle portion of the monochrome signal and the resultant subcarrier wave signal add in the unit 28 to develop a desired composite video-frequency signal, the subcarrier wave signal of which is capable of being symmetrically sampled in the image-reproducing apparatus 16.

Figure 5:
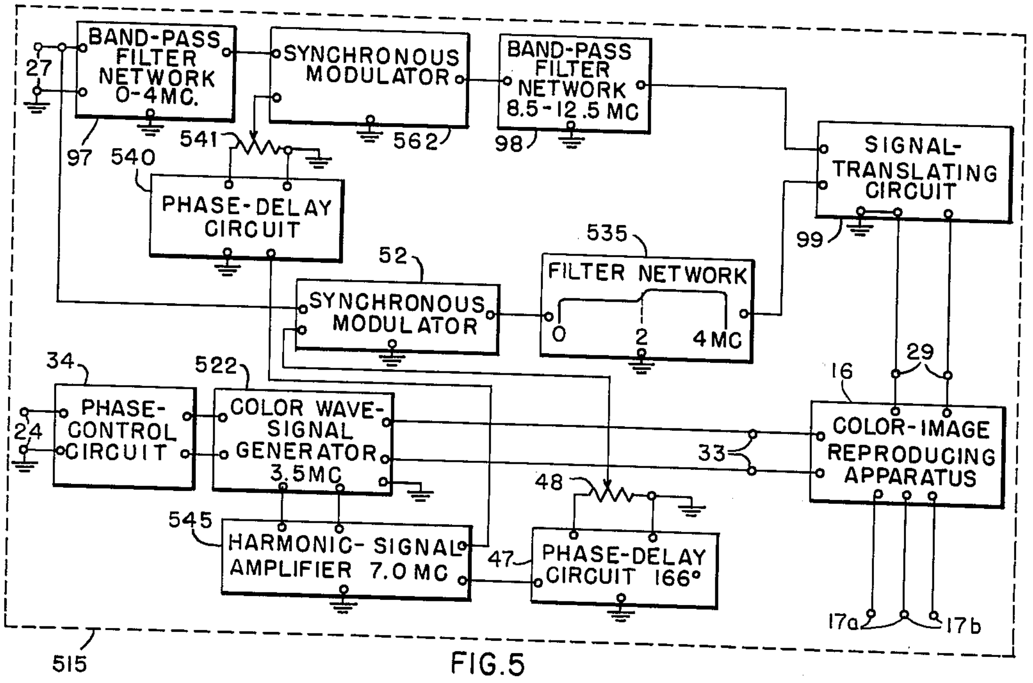

*Description and operation of signal-translating system of FIG. 5*

It may at times be desirable instead of deriving the corrected 0–2 megacycle monochrome component external to the cathode-ray tube of the image-reproducing device as, for example, in the embodiment of FIG. 4 to derive such component within the device. It is apparent from a consideration of the embodiments previously described herein that if relative narrow angle sampling is employed in the cathode-ray tube, the monochrome component combines with the color-signal components only at three distinct phase points, specifically at the phase points 0°, 120°, and 240° of a cycle at the frequency of the subcarrier wave signal. In view of this need for a correct monochrome component only within the narrow sampling angle, it may be desirable to develop a properly phase-corrected monochrome component effectively occurring at the 0°, 120°, and 240° phase points of the 3.5-megacycle subcarrier wave signal. The signal-translating system of FIG. 5 is designed to effect such a result.

The system of FIG. 5 includes portions corresponding to portions of the signal-translating systems of FIGS. 1, 3, and 4, and, therefore, corresponding units are designated by the same reference numerals and analogous units by the same reference numerals with a prefix of "5" or, where applicable, by replacing a prefix used in FIG. 3 or 4 by a prefix of "5" for the analogous unit in FIG. 5.

The system 515 of FIG. 5 comprises a signal-translating channel coupled to the input terminals 27, 27 and a signal-translating circuit 99 and which includes, in cascade, a 0.4 megacycle filter network 97, a synchronous modulator 562, and a band-pass filter network 98. The network 98 preferably has a pass band of 8.5–12.5 megacycles. The modulator 562 is similar to the modulator 62 of FIG. 4 except that the signals applied to these modulators and developed in the output circuits thereof differ requiring different proportions for the circuit elements. Another signal-translating channel coupled between the terminals 27, 27 and the circuit 99 comprises, in cascade, a synchronous modulator 52 and a filter network 535 similar to the network 335 of FIG. 3. The harmonic-signal amplifier 545 is coupled to an output circuit of the generator 522 and has output circuits effective to develop signals in each thereof having frequencies of 7.0 megacycles. One of the latter output circuits is coupled through a phase-delay circuit 540 and a voltage divider 541 to an input circuit of the modulator 562 while the other of such circuits is coupled through a phase-delay circuit 47 and a voltage divider 48 to an input circuit of the modulator 52.

In the system 515 the units 97, 98, 540, 541, and 562 comprise the signal-translating network while the units 52, 99, and 535 comprise the control circuit.

The channel including the synchronous modulator 52 and the filter network 535 operates in a manner similar to that of the corresponding channel in the network of FIG. 3 to develop a subcarrier wave signal from which the proper modulation components may be derived in a symmetrical manner. This signal is applied to an input circuit of the signal-translating circuit 99. As in the network of FIG. 3, this channel also translates the brightness signal Y.

The phasing and intensity of the 7 megacycle signal applicator to the modulator 562, as controlled by the unit 540 and the voltage divider 541, respectively, are such that, as a result of heterodyning with the modulated 3.5-megacycle subcarrier translated through the unit 97 and applied to another input circuit of the modulator 562, there is developed a resultant 10.5-megacycle wave signal which is effectively modulated by a corrected 0–2 megacycle monochrome component. The manner in which the proper phasing and intensity of the 7-megacycle signal are determined is similar to the determination of analogous signals discussed with reference to FIGS. 1, 3, and 4. It should be apparent that, if, as described with reference to FIG. 4, two 3.5-megacycle wave signals may be so phased and be proportioned to be of such relative intensity as to heterodyne in a unit such as the unit 62 of FIG. 4 to develop a corrected 0–2 megacycle monochrome signal, then in an analogous manner the 3.5-megacycle subcarrier wave signal may be caused to heterodyne with a 7-megacycle signal of proper phase and intensity to develop a 10.5-megacycle signal having the desired correction signal at predetermined phase points thereof. The latter signal including its side bands is translated through the network 98 and applied to another input circuit of the signal-translating circuit 99. The signal-translating circuit 99 is a circuit for combining the applied signals for translation through a common pass band and, thus, develops a composite video-frequency signal having 0–4 megacycle components and 8.5–12.5 megacycle components. The composite video-frequency signal may then be translated through the terminals 29, 29 to the image-reproducing apparatus 16 and utilized in such apparatus to effect reproduction of a color image. In effecting such reproduction the 3.5-megacycle sampling is effective to derive from the modulated 10.5-megacycle signal a corrected 0–2 megacycle monochrome component for each of the three phase positions of the subcarrier wave signal.

There have been described herein embodiments of the present invention which are effective to modify a composite video-frequency signal which includes components for utilization in a color signal-deriving system arranged asymmetrically to derive the color signals. The composite video-frequency signal has been described as being modified to one which may be utilized in a color signal-deriving system which is arranged to derive the color-signal information in a symmetrical manner. Essentially, the modification is effected by deriving from the subcarrier wave-signal component of the applied composite video-frequency signal a correction signal. This correction signal is then effectively combined with the color-signal components derived in the color signal-deriving system and is effective to convert such components to ones similar to those which would have been derived if the applied composite video-frequency signal had been utilized in the type of color signal-deriving system in which it was intended to be utilized. Though these embodiments have been directed to a complete conversion from one type of composite video-frequency signal to another, it should be understood that the principles of operation considered herein are also effective to develop a correction signal in those color signal-deriving systems which are of the proper but in which, for some reason, the derived signals are not properly constant luminance signals for the image-reproducing apparatus being employed. In the latter case, knowing the difference between the compositions of the signals which should be derived and those which are in reality derived, it is possible to derive from some phase point of the subcarrier wave signal a correction signal which will effectively cause the derived color signals to be the proper ones.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A signal-translating system for a color-television receiver comprising: circuit means for supplying a first signal primarily representative of the visual brightness of a televised color image and a second signal effectively multiplex-modulated by signals primarily representative of the chromaticity of said image; a color image-reproducing apparatus for utilizing said first and said second signals to reproduce said color image and in which said second signal when applied thereto tends to affect the visual brightness of said image; signal-translating network means coupled to said supply circuit means and responsive to said second signal and including a detector arrangement for deriving from said second signal a correction signal representative of that component of said second signal which tends to affect the visual brightness of said reproduced image; and control circuit means coupled to said signal-translating network means, said supply circuit means, and said apparatus for applying said first signal, said second signal, and said correction signal to said apparatus and including signal-combining means for adding said first signal and said correction signal, whereby in said image-reproducing apparatus said first signal is effective primarily to determine the visual brightness of said reproduced image, said second signal is effective primarily to determine the chromaticity of said image, and said correction signal is effective substantially to cancel any brightness which said second signal tends to produce in said image.

2. A signal-translating system for a color-television receiver comprising: circuit means for supplying a first signal primarily representative of the visual brightness of a televised color image and a second signal effectively multiplex-modulated by signals primarily representative of the chromaticity of said image; a color image-reproducing apparatus including a single electron gun for developing an electron beam and for utilizing said first and said second signals to reproduce said color image and in which said second signal when applied to said gun to control the intensity of said beam tends to affect the visual brightness of said image; signal-translating network means coupled to said supply circuit means responsive to said second signal and including a detector arrangement for deriving from said second signal a correction signal representative of that component of said second signal which tends to affect the visual brightness of said reproduced image; and control circuit means coupled to said signal-translating network means, said supply circuit means, and said apparatus for applying said first signal, said second signal, and said correction signal to said electron gun to control the intensity of said beam and including signal-combining means for adding said first signal and said correction signal, whereby in said image-reproducing apparatus said first signal is effective primarily to control the intensity of said beam to determine the visual brightness of said reproduced image, said second signal is effective primarily to control the intensity of said beam to determine the chromaticity of said image, and said correction signal is effective to control the intensity of said beam substantially to cancel any brightness which said second signal tends to produce in said image.

3. A signal-translating system for a color-television receiver comprising: circuit means for supplying a first signal primarily representative of the visual brightness of a televised color image and a second signal effectively multiplex-modulated in an asymmetrical manner by signals primarily representative of the chromaticity of said image; a color image-reproducing apparatus for utilizing said first and said second signals to reproduce said color image and including means for deriving modulation components from said second signal in a symmetrical manner so that said second signal when applied thereto tends to affect the visual brightness of said image; signal-translating network means coupled to said supply circuit means responsive to said second signal and including a detector arrangement for deriving from said second signal a correction signal representative of that component of said second signal which tends to affect the visual brightness of said reproduced image; and control circuit means coupled to said signal-translating network means, said supply circuit means, and said apparatus for applying said first signal, said second signal, and said correction signal to said apparatus and including signal-combining means for adding said first signal and said correction signal, whereby in said image-reproducing apparatus said first signal is effective primarily to determine the visual brightness of said reproduced image, said second signal is effective primarily to determine the chromaticity of said image, and said correction signal is effective substantially to cancel any brightness which said second signal tends to produce in said image.

4. A signal-translating system for a color-television receiver comprising: circuit means for supplying a first signal primarily representative of the visual brightness of a televised color image and a second signal effectively multiplex-modulated by signals primarily representative of the chromaticity of said image; a color image-reproducing apparatus for utilizing said first and said second signals to reproduce said color image and in which said second signal when applied thereto tends to affect the visual brightness of said image; signal-translating network means coupled to said supply circuit means responsive to said second signal and including a detector arrangement having circuit elements so proportioned as to derive from a phase of said second signal a correction signal representative of that component of said second signal which tends to affect the visual brightness of said reproduced image; and control circuit means coupled to said signal-translating network means, said supply circuit means, and said apparatus for applying said first signal, said second signal, and said correction signal to said apparatus and including signal-combining means for adding said first signal and said correction signal, whereby in said image-reproducing apparatus said first signal is effective primarily to determine the visual brightness of said reproduced image, said second signal is effective primarily to determine the chromaticity of said image, and said correction signal is effective substantially to cancel any brightness which said second signal tends to produce in said image.

5. A signal-translating system for a color-television receiver comprising: circuit means for supplying a first signal primarily representative of the visual brightness of a televised color image and a second signal effectively multiplex-modulated in an asymmetrical manner by signals primarily representative of the chromaticity of said image; a color image-reproducing apparatus for utilizing said first and said second signals to reproduce said color image and including means for deriving modulation components from said second signal in a symmetrical manner so that said second signal when applied thereto tends to affect the visual brightness of said image; signal-translating network means coupled to said supply circuit means responsive to said second signal and including a detector arrangement for deriving from a phase of said second signal a correction signal representative of that component of said second signal which tends to affect the visual brightness of said reproduced image; and control circuit means coupled to said supply circuit means, said network means, and said apparatus for applying said first signal, said second signal, and said correction signal to said apparatus and including signal-combining means for adding said first signal and said correction signal, whereby in said image-reproducing apparatus said first signal is effective primarily to determine the visual brightness of said reproduced image, said modulation components of said second signal are derived by said deriving means in a symmetrical manner and are effective primarily to determine the chromaticity of said image, and said correction signal is effective substantially to cancel any brightness which said second signal tends to produce in said image.

6. A signal-translating system for a color-television receiver comprising: circuit means for supplying a first signal primarily representative of the visual brightness of a televised color image and a second signal effectively multiplex-modulated at unequally spaced phase points by signals primarily representative of the chromaticity of said image; a color image-reproducing apparatus for utilizing said first and said second signals to reproduce said color image and in which said second signal when applied thereto tends to affect the visual brightness of said image; signal-translating network means coupled to said supply circuit means responsive to said second signal, including a detector arrangement for deriving from said second signal a correction signal representative of that component of said second signal which tends to affect the visual brightness of said reproduced image, a source of a signal harmonically related in frequency to said second signal, and a modulator responsive to said second signal and said harmonically related signal to develop a resultant signal effectively having the modulation components of said second signal at equally spaced phase points thereon; and control circuit means coupled to said supply circuit means, said network means, and said apparatus for applying said first signal, said resultant signal, and said correction signal to said apparatus and including signal combining means for adding said first signal and said correction signal, whereby in said image-reproducing apparatus said first signal is effective primarily to determine the visual brightness of said reproduced image, said resultant signal is effective primarily to determine the chromaticity of said image, and said correction signal is effective substantially to cancel any brightness which said resultant signal tends to produce in said image.

7. A signal-translating system for a color-television receiver comprising: circuit means for supplying a first signal primarily representative of the visual brightness of a televised color image and a second signal effectively multiplex-modulated in an asymmetrical manner by signals primarily representative of the chromaticity of said image; a color image-reproducing apparatus for utilizing said first and said second signals to reproduce said color image and including means for deriving modulation components from said second signal in a symmetrical manner as a result of which said second signal when applied thereto tends to affect the visual brightness of said image; signal-translating network means coupled to said supply circuit means and responsive to said second signal, including a detector arrangement for deriving from said second signal a correction signal representative of that component of said second signal which tends to affect the visual brightness of said reproduced image and a signal-modifying circuit for remolding said second signal to cause said modulation components thereof to be symmetrically disposed thereon; and control circuit means coupled to said supply circuit means, said network means, and said apparatus for applying said first signal, said remolded second signal, and said correction signal to said apparatus and including signal-combining means for adding said first signal and said correction signal, whereby in said image-reproducing apparatus said first signal is effective primarily to determine the visual brightness of said reproduced image, said remolded second signal is effective primarily to determine the chromaticity of said image, and said correction signal is effective substantially to cancel any brightness which said remolded second signal tends to produce in said image.

8. In a color-television receiver, a system for converting a luminance-signal component proportioned in a predetermined manner with respect to predetermined primary colors to a differently proportioned luminance component comprising: circuit means for supplying a composite color-television signal including a video-frequency luminance component and a chrominance-subcarrier signal; signal-translating circuit means coupled to said supply circuit means for translating said luminance component; circuit means for deriving from said subcarrier signal a luminance-correction signal component; and circuit means coupled to said signal-translating circuit means and to said signal-deriving circuit means for adding said translated luminance component and said luminance-correction component to develop the resultant differently proportioned luminance component.

References Cited by the Examiner

UNITED STATES PATENTS

| | | | |
|---|---|---|---|
| 2,657,253 | 10/1953 | Bedford | 178—5.2 |
| 2,715,155 | 8/1955 | Bryan | 178—5.4 |
| 2,858,366 | 10/1958 | Schroeder | 178—5.4 |

OTHER REFERENCES

"Processing of the NTSC Color Signal for One Gun Sequential Color Displays," Hazeltine Report 7148, October 21, 1953.

DAVID G. REDINBAUGH, *Primary Examiner.*

STEPHEN W. CAPELLI, ROBERT H. ROSE, NEWTON N. LOVEWELL, *Examiners.*